(12) United States Patent
Sciannanteno et al.

(10) Patent No.: US 6,283,490 B1
(45) Date of Patent: Sep. 4, 2001

(54) VEHICLE TOWING BAR ASSEMBLY

(76) Inventors: Grazia Sciannanteno; Pasquale Sciannanteno, both of 108 Ainslie St., Brooklyn, NY (US) 11211; Maria Ruzza, 31 Emerson Way, Floral Park, NY (US) 11001; Pietro Sciannanteno, deceased, late of Brooklyn, NY (US), by Grazia Sciannanteno, legal representative ( * ) Notice: Subject to any disclaimer, the term of this patent is extended or adjusted under 35 U.S.C. 154(b) by 0 days.

(21) Appl. No.: 09/466,096

(22) Filed: Dec. 17, 1999

(51) Int. Cl.$^7$ .................................................. B60D 1/155
(52) U.S. Cl. ............................................ 280/493; 280/482
(58) Field of Search .................................. 280/493, 482, 280/491.1, 480, 480.1, 491.5, 491.2, 491.4, 292; D12/162

(56) References Cited

U.S. PATENT DOCUMENTS

| | | |
|---|---|---|
| D. 331,899 | 12/1992 | Brisson . |
| 1,654,939 * | 1/1928 | Loebs . |
| 2,448,311 | 8/1948 | Hill . |
| 2,550,561 | 4/1951 | Hill . |
| 3,292,950 * | 12/1966 | Kirkpatrick . |
| 3,797,846 * | 3/1974 | Pevic ...................................... 280/24 |
| 4,047,734 | 9/1977 | Miles . |
| 4,699,394 * | 10/1987 | Laie ...................................... 280/493 |
| 4,958,847 | 9/1990 | Williams . |
| 5,039,120 * | 8/1991 | Stowe .................................. 280/204 |
| 5,067,742 * | 11/1991 | Relja ................................. 280/479.2 |
| 5,112,074 | 5/1992 | Smith . |
| 5,167,423 * | 12/1992 | Hall, Jr. .............................. 280/486 |

* cited by examiner

*Primary Examiner*—Anne Marie Boehler
*Assistant Examiner*—Avraham H. Lerner

(57) ABSTRACT

A vehicle towing bar assembly for providing a user with a towing bar that can be easily used by anyone to tow a vehicle to safety. The vehicle towing bar assembly includes a vehicle towing bar assembly, which includes a central tow bar member. A pair of outer tow bar members couplable to the central tow bar member and a pair of eye link members. Each eye link member is coupled to a distal end of an associated one of the outer tow bar members. The eye links are designed for engagement to a tow ring of a vehicle. In an embodiment designed for use with a car the central tow bar member includes two coaxial tubes. In an embodiment designed for use with a truck, the central tow bar member includes a medial offset portion and a pair of extension members.

13 Claims, 2 Drawing Sheets

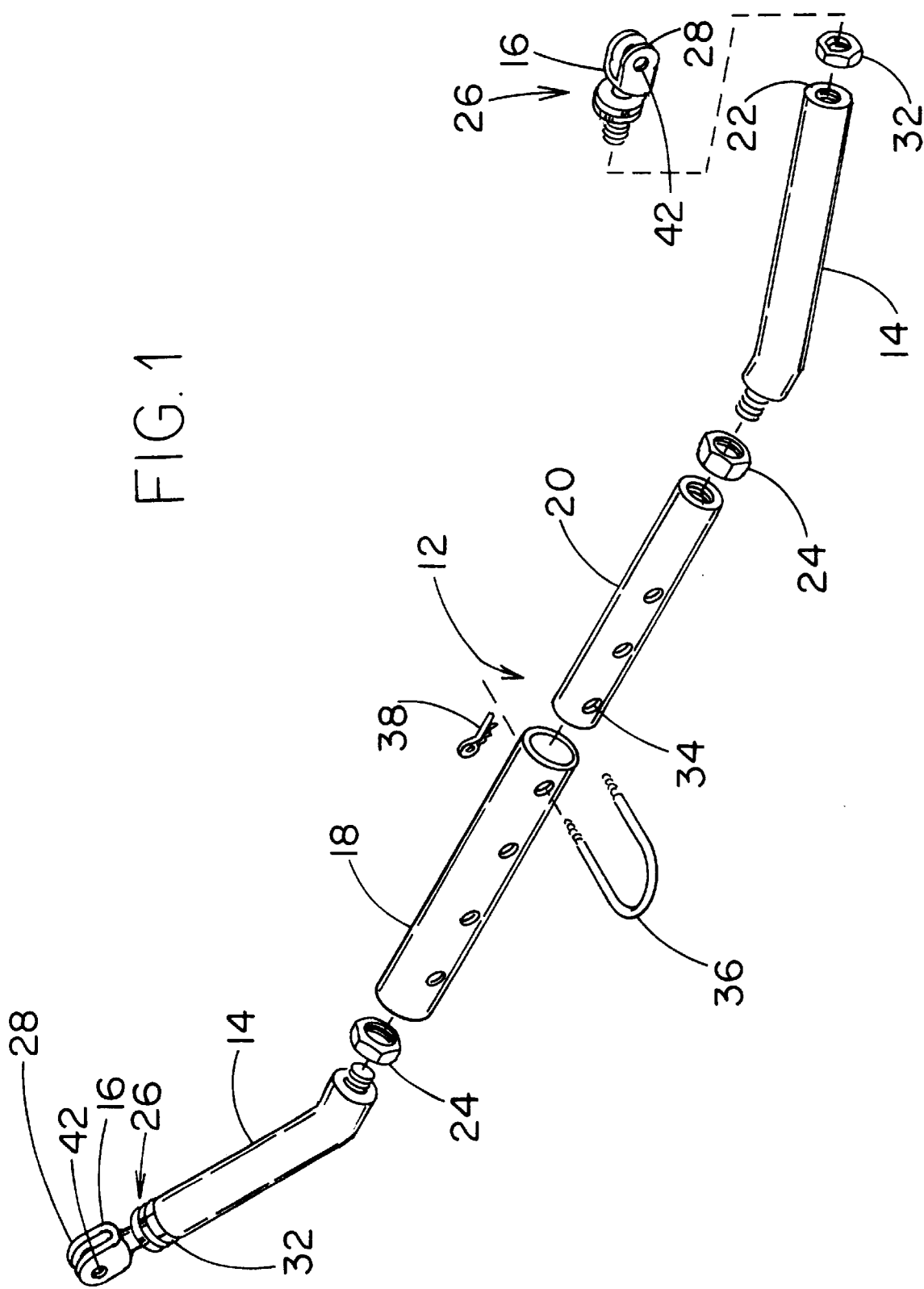

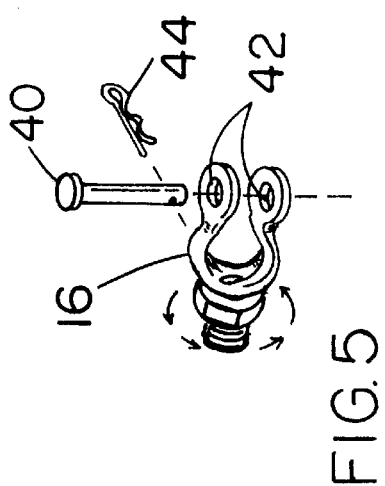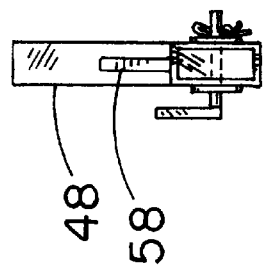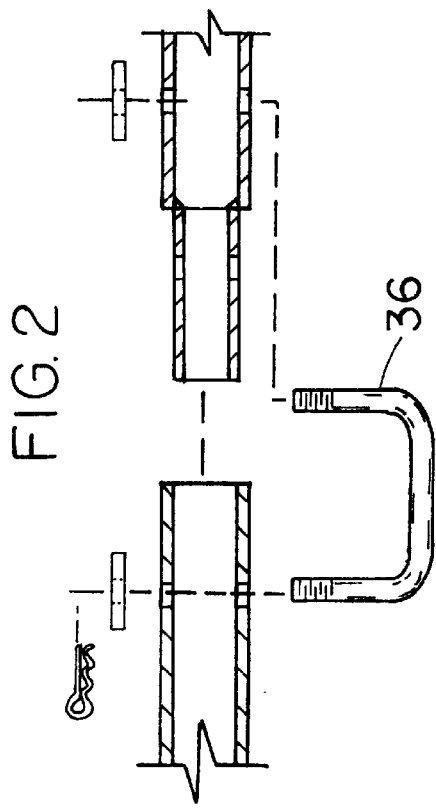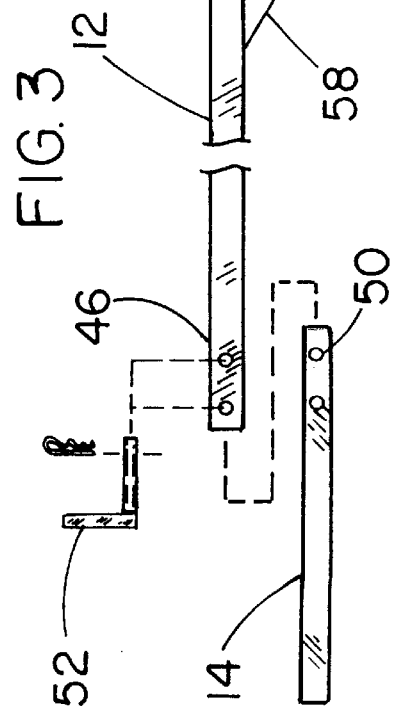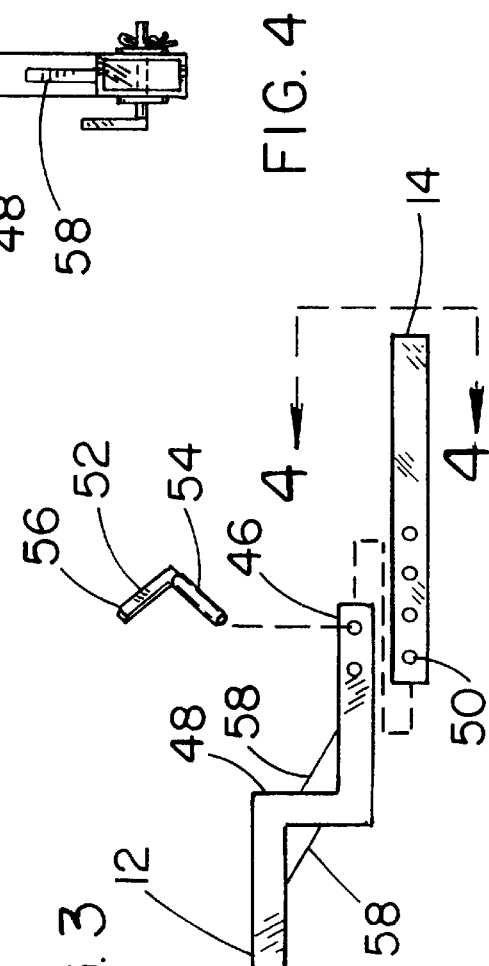

US 6,283,490 B1

VEHICLE TOWING BAR ASSEMBLY

BACKGROUND OF THE INVENTION

1. Field of the Invention

The present invention relates to vehicle towing bar assemblies and more particularly pertains to a new vehicle towing bar assembly for providing a user with a towing bar that can be easily used by anyone to tow a vehicle to safety.

2. Description of the Prior Art

The use of vehicle towing bar assemblies is known in the prior art. More specifically, vehicle towing bar assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,112,074; 4,047,734; 4,958,847; 2,550,561; 2,448,311; and U.S. Pat. No. Des. 331,899.

While these devices fulfill their respective, particular objectives and requirements, the aforementioned patents do not disclose a new vehicle towing bar assembly. The inventive device includes a vehicle towing bar assembly, which includes a central tow bar member, a pair of outer tow bar members couplable to the central tow bar member, and a pair of eye link members. Each eye link member is coupled to a distal end of an associated one of the outer tow bar members. The eye links are designed for engagement to a tow ring of a vehicle. In an embodiment designed for use with a car the central tow bar member includes two coaxial tubes. In an embodiment designed for use with a truck, the central tow bar member includes a medial offset portion and two extension members.

In these respects, the vehicle towing bar assembly according to the present invention substantially departs from the conventional concepts and designs of the prior art, and in so doing provides an apparatus primarily developed for the purpose of providing a user with a towing bar that can be easily used by anyone to tow a vehicle to safety.

SUMMARY OF THE INVENTION

In view of the foregoing disadvantages inherent in the known types of vehicle towing bar assemblies now present in the prior art, the present invention provides a new vehicle towing bar assembly construction wherein the same can be utilized for providing a user with a towing bar that can be easily used by anyone to tow a vehicle to safety.

The general purpose of the present invention, which will be described subsequently in greater detail, is to provide a new vehicle towing bar assembly apparatus and method which has many of the advantages of the vehicle towing bar assemblies mentioned heretofore and many novel features that result in a new vehicle towing bar assembly which is not anticipated, rendered obvious, suggested, or even implied by any of the prior art vehicle towing bar assemblies, either alone or in any combination thereof.

To attain this, the present invention generally comprises a vehicle towing bar assembly, which includes a central tow bar member, a pair of outer tow bar members couplable to the central tow bar member, and a pair of eye link members. Each eye link member is coupled to a distal end of an associated one of the outer tow bar members. The eye links are designed for engagement to a tow ring of a vehicle. In an embodiment designed for use with a car the central tow bar member includes two coaxial tubes. In an embodiment designed for use with a truck, the central tow bar member includes a medial offset portion and a pair of extension members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle towing bar assembly apparatus and method which has many of the advantages of the vehicle towing bar assemblies mentioned heretofore and many novel features that result in a new vehicle towing bar assembly which is not anticipated, rendered obvious, suggested, or even implied by any of the prior art vehicle towing bar assemblies, either alone or in any combination thereof.

It is another object of the present invention to provide a new vehicle towing bar assembly that may be easily and efficiently manufactured and marketed.

It is a further object of the present invention to provide a new vehicle towing bar assembly that is of a durable and reliable construction.

An even further object of the present invention is to provide a new vehicle towing bar assembly which is susceptible of a low cost of manufacture with regard to both materials and labor, and which accordingly is then susceptible of low prices of sale to the consuming public, thereby making such vehicle towing bar assembly economically available to the buying public.

Still yet another object of the present invention is to provide a new vehicle towing bar assembly which provides in the apparatuses and methods of the prior art some of the advantages thereof, while simultaneously overcoming some of the disadvantages normally associated therewith.

Still another object of the present invention is to provide a new vehicle towing bar assembly for providing a user with a towing bar that can be easily used by anyone to tow a vehicle to safety.

Yet another object of the present invention is to provide a new vehicle towing bar assembly which includes a vehicle towing bar assembly, which includes a central tow bar member. A pair of outer tow bar members couplable to the central tow bar member and a pair of eye link members. Each eye link member is coupled to a distal end of an associated one of the outer tow bar members. The eye links are designed for engagement to a tow ring of a vehicle. In an embodiment designed for use with a car the central tow bar member includes two coaxial tubes. In an embodiment designed for use with a truck, the central tow bar member includes a medial offset portion.

Still yet another object of the present invention is to provide a new vehicle towing bar assembly that is telescopic to allow a user to set the desired hook-up length for towage or storage into the vehicle trunk.

Even still another object of the present invention is to provide a new vehicle towing bar assembly that eliminates the hassle and expense of tow cost and waiting time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new vehicle towing bar assembly according to the present invention.

FIG. 2 is a cross-sectional view of the present invention.

FIG. 3 is an exploded view of an alternate embodiment of the present invention.

FIG. 4 is an end view of an alternate embodiment of the present invention.

FIG. 5 is a perspective view of the eye link of the present invention.

DESCRIPTION OF THE PREFERRED EMBODIMENT

With reference now to the drawings, and in particular to FIGS. 1 through 5 thereof, a new vehicle towing bar assembly embodying the principles and concepts of the present invention and generally designated by the reference numeral 10 will be described.

As best illustrated in FIGS. 1 through 5, the vehicle towing bar assembly 10 generally comprises a tubular central tow bar member 12 and a pair of tubular outer tow bar members 14 couplable to the central tow bar member 12. A pair of eye link members 16 are coupled to a distal end of an associated one of the outer tow bar members 14. Each eye link 16 is designed for engagement to a tow ring of a vehicle.

The central tow bar member includes a first portion 18 telescopically couplable to a second portion 20. The first portion 18 is coaxially aligned with the second portion 20 and sized for insertion into the second portion 20. Each of the outer tow bar members 14 are angled. Each of the outer tow bar members 14 includes a threaded outer bar extension 22 for engaging an associated end of the central tow bar member 12.

A pair of tow bar lock nuts 24 are provided. Each tow bar lock nut 24 is coupled to an associated one of the threaded outer bar extensions 22 for holding the angled outer tow bar member 14 in a selectable orientation with respect to the central tow bar member 12. Each eye link member 16 includes a threaded eye link extension 26 for engaging an associated distal end of the outer tow bar members 14 when the outer tow bars 14 are coupled to the central tow bar member 12. Each eye link 16 includes a pair of spaced arms 28 extending outwardly from a base portion 30.

The base portion 30 is rotatably coupled to the threaded eye link extension 26. A pair of eye link lock nuts 32, each eye link lock nut 32 is coupled to an associated one of the threaded eye link extensions 26 for securely coupling the eye links 16 to the outer tow bar members 14.

The first and second portions 18, 20 of the central tow bar member 12 each includes a plurality of spaced apertures 34 arranged along a length of the first 18 and second portions 20 whereby apertures 34 from the first 18 and second 20 portions are alignable when the first portion 18 is inserted into the second portion 20. A generally U-shaped bolt 36 insertable through the aligned apertures 34 in the first 18 and second 20 portions for holding the first 18 and second 20 portions in static relationship to each other.

A fastening member 38 is provided for engaging the U-shaped bolt 36 whereby the U-shaped bolt 36 is coupled to the central tow bar member 12. A pair of locking pins 40 are provided. Each locking pin 40 is insertable through aligned holes 42 in a respective one of the eye links 16 for coupling the eye links 16 to tow rings of a vehicle. A pair of cotter pins 44 are provided and each cotter pin 44 is insertable through an associated one of the locking pins 40 for securing the locking pin 40 to the respective eye link 16.

An alternate embodiment of the vehicle towing bar assembly 10 also includes a central tow bar member 12, a pair of outer tow bar members 14 couplable to the central tow bar member 12, and a pair of eye link members 16. Again, each eye link member 16 is coupled to a distal end of an associated one of the outer tow bar members 14 and each eye link 16 is designed for engagement to a tow ring of a vehicle.

In an alternate embodiment, the central tow bar member 12 includes a pair of extension portions 46 and a medial offset portion 48. The extension portions 46 each include a generally rectangular cross-section transverse to a longitudinal axis of the extension portions 46. The medial offset portion 48 includes a generally rectangular cross-section transverse to a longitudinal axis of the medial offset portion 48. The extension portions 46 extend outwardly from opposite ends of the offset portion 48, a first one of the extension portions 46 extending outwardly from the offset portion 48 in a first direction and a second of the extension portions 46 extending outwardly from the offset portion 48 in a second direction opposite the first direction.

In the alternate embodiment, each of the outer tow bar members 14 includes a generally rectangular cross-section transverse to a longitudinal axis of the outer tow bar members 14. Each of the outer tow bar members 14 are telescopically couplable to the central tow bar member 12. Each of the outer tow bar portions 14 are insertable into an associated one of the extension portions 46 of the central tow bar member 12. Each outer tow bar member 12 includes a respective plurality of coupling holes 50 arranged to extend inwardly from an end of the outer tow bar insertable into the extension portions 46.

Each extension portion 46 of the central tow bar member 12 includes a plurality of coupling holes 50 arranged to be alignable with the coupling holes 50 of the outer tow bar members 14 when the outer tow bar members 14 are inserted into the extension portions 46.

A pair of extension pins 52 are insertable through the aligned coupling holes 50 for coupling the outer tow bar members 14 to the extension portions 46 of the central tow bar member 12. The extension pins 52 each include an insertion portion 54 and a gripping flange 56 extending from the insertion portion 46. The gripping flange 56 extends substantially orthogonally outward from the insertion portion 54 for facilitating gripping of the insertion pin 52 when inserting and removing the insertion pin 52.

In the above embodiments, each eye link member 16 includes a threaded eye link extension 26 for engaging an associated distal end of the outer tow bar members 14 when the outer tow bars 14 are coupled to the central tow bar member 12. Each eye link 16 includes a pair of spaced arms 28 extending outwardly from a base portion 30. The base portion 30 is rotatably coupled to the threaded eye link extension 26. A pair of eye link lock nuts 32, each eye link lock nut 32 is coupled to an associated one of the threaded eye link extensions 26 for securely coupling the eye links 16 to the outer tow bar members 14.

A pair of support plates 58 extend outwardly from the offset portion 48 and are coupled to an associated one of the extension portions 46. A pair of locking pins 40 are provided and each locking pin 40 is insertable through aligned holes 42 in a respective one of the eye links 16 for coupling the eye links 16 to tow rings of a vehicle. Each of a pair of cotter pins 44 are insertable through an associated one of the locking pins 40 for securing the locking pin 40 to the respective eye link 16.

In use, a user hooks one end of the tow bar assembly to the back of the tow vehicle and the other end of the tow bar assembly to the front of the disabled vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle towing bar assembly, comprising:

a central tow bar member, a pair of outer tow bar members couplable to said central tow bar member;

a pair of eye link members, each eye link member being coupled to a distal end of an associated one of said outer tow bar members, each eye link being adapted for engagement to a tow ring of a vehicle;

said central tow bar member further comprising a first portion telescopically couplable to a second portion, said first portion being coaxially aligned with said second portion and sized for insertion into said second portion;

each of said outer tow bar members being angled, each said outer tow bar member having a threaded outer bar extension for engaging an associated end of said central towing member; and a pair of tow bar lock nuts, each tow bar lock nut being coupled to an associated one of said threaded outer bar extensions for holding said angled outer tow bar member in a selectable orientation with respect to said central tow bar member.

2. The vehicle towing bar assembly of claim 1, further comprising:

each eye link member having a threaded eye link extension for engaging an associated distal end of said outer tow bar members when said outer tow bars are coupled to said central tow bar member;

each eye link having a pair of spaced arms extending outwardly from a base portion; and said base portion being rotatably coupled to said threaded eye link extension.

3. The vehicle towing bar assembly of claim 2, further comprising:

a pair of eye link lock nuts, each eye link lock nut being coupled to an associated one of said threaded eye link extensions for securely coupling said eye links to said outer tow bar members.

4. The vehicle towing bar assembly of claim 1, further comprising:

said first and second portions of said central tow bar member each having a plurality of spaced apertures arranged along a length of said first and second portions whereby apertures from said first and second portions are alignable when said first portion is inserted into said second portion;

a generally U-shaped bolt insertable through said aligned apertures in said first and second portions for holding said first and second portions in static relationship to each other; and a fastening member for engaging said U-shaped bolt whereby said U-shaped bolt is coupled to said central tow bar member.

5. A vehicle towing bar assembly, comprising:

a central tow bar member, a pair of outer tow bar members couplable to said central tow bar member;

a pair of eye link members, each eye link member being coupled to a distal end of an associated one of said outer tow bar members, each eye link being adapted for engagement to a tow ring of a vehicle;

said central tow bar member including a pair of extension portions and a medial offset portion, said extension portions extending outwardly from opposite ends of said offset portion, a first one of said extension portions extending outwardly from said offset portion in a first direction and a second of said extension portions extending outwardly from said offset portion in a second direction opposite said first direction.

6. The vehicle towing bar assembly of claim 5, further comprising:

each of said outer tow bar members being telescopically couplable to said central tow bar member, each of said outer tow bar portions being insertable into an associated one of said extension portions of said central tow bar member, each outer tow bar member having a respective plurality of coupling holes arranged to extend inwardly from an end of the outer tow bar insertable into said extension portions;

each extension portion of said central tow bar member having a plurality of coupling holes arranged to be alignable with said coupling holes of said outer tow bar members when said outer tow bar members are inserted into said extension portions; and a pair of extension pins insertable through said aligned coupling holes for coupling said outer tow bar members to said extension portions of said central tow bar member.

7. The vehicle towing bar assembly of claim 6, further comprising:

said extension pins each having an insertion portion and a gripping flange extending from the insertion portion, said gripping flange extending substantially orthogonally outward from said insertion portion for facilitating gripping of said insertion pin when inserting and removing the insertion pin.

8. The vehicle towing bar assembly of claim 5, further comprising:

each eye link member having a threaded eye link extension for engaging an associated distal end of said outer tow bar members when said outer tow bars are coupled to said central tow bar member;

each eye link having a pair of spaced arms extending outwardly from a base portion; and said base portion being rotatably coupled to said threaded eye link extension.

9. The vehicle towing bar assembly of claim 8, further comprising:

a pair of eye link lock nuts, each eye link lock nut being coupled to an associated one of said threaded eye link extensions for securely coupling said eye links to said outer tow bar members.

10. The vehicle towing bar assembly of claim 9, further comprising:

a pair of locking pins, each locking pin being insertable through aligned holes in a respective one of said eye links for coupling said eye links to tow rings of a vehicle; and a pair of cotter pins, each cotter pin being insertable through an associated one of said locking pins for securing said locking pin to said respective eye link.

11. The vehicle towing bar assembly of claim 5, further comprising:

a pair of support plates, each support plate extending outwardly from said offset portion and coupled to an associated one of said extension portions.

12. The vehicle towing bar assembly of claim 5, further comprising:

said extension portions each having a generally rectangular cross-section transverse to a longitudinal axis of said extension portions, said medial offset portion having a generally rectangular cross-section transverse to a longitudinal axis of said medial offset portion;

each of said outer tow bar members having a generally rectangular cross-section transverse to a longitudinal axis of said outer tow bar members;

each of said outer tow bar members being telescopically couplable to said central tow bar member, each of said outer tow bar portions being insertable into an associated one of said extension portions of said central tow bar member, each outer tow bar member having a respective plurality of coupling holes arranged to extend inwardly from an end of the outer tow bar insertable into said extension portions;

each extension portion of said central tow bar member having a plurality of coupling holes arranged to be alignable with said coupling holes of said outer tow bar members when said outer tow bar members are inserted into said extension portions; and a pair of extension pins insertable through said aligned coupling holes for coupling said outer tow bar members to said extension portions of said central tow bar member;

said extension pins each having an insertion portion and a gripping flange extending from the insertion portion, said gripping flange extending substantially orthogonally outward from said insertion portion for facilitating gripping of said insertion pin when inserting and removing the insertion pin;

each eye link member having a threaded eye link extension for engaging an associated distal end of said outer tow bar members when said outer tow bars are coupled to said central tow bar member;

each eye link having a pair of spaced arms extending outwardly from a base portion;

said base portion being rotatably coupled to said threaded eye link extension;

a pair of eye link lock nuts, each eye link lock nut being coupled to an associated one of said threaded eye link extensions for securely coupling said eye links to said outer tow bar members;

a pair of support plates, each support plate extending outwardly from said offset portion and coupled to an associated one of said extension portions;

a pair of locking pins, each locking pin being insertable through aligned holes in a respective one of said eye links for coupling said eye links to tow rings of a vehicle; and a pair of cotter pins, each cotter pin being insertable through an associated one of said locking pins for securing said locking pin to said respective eye link.

13. A vehicle towing bar assembly, comprising:

a generally tubular central tow bar member, a pair of generally tubular outer tow bar members couplable to said central tow bar member;

a pair of eye link members, each eye link member being coupled to a distal end of an associated one of said outer tow bar members, each eye link being adapted for engagement to a tow ring of a vehicle;

said central tow bar member further comprising a first portion telescopically couplable to a second portion, said first portion being coaxially aligned with said second portion and sized for insertion into said second portion;

each of said outer tow bar members being angled, each said outer tow bar member having a threaded outer bar extension for engaging an associated end of said central towing member; and a pair of tow bar lock nuts, each tow bar lock nut being coupled to an associated one of said threaded outer bar extensions for holding said angled outer tow bar member in a selectable orientation with respect to said central tow bar member;

each eye link member having a threaded eye link extension for engaging an associated distal end of said outer tow bar members when said outer tow bars are coupled to said central tow bar member;

each eye link having a pair of spaced arms extending outwardly from a base portion;

said base portion being rotatably coupled to said threaded eye link extension;

a pair of eye link lock nuts, each eye link lock nut being coupled to an associated one of said threaded eye link extensions for securely coupling said eye links to said outer tow bar members;

said first and second portions of said central tow bar member each having a plurality of spaced apertures arranged along a length of said first and second portions whereby apertures from said first and second portions are alignable when said first portion is inserted into said second portion;

a generally U-shaped bolt insertable through said aligned apertures in said first and second portions for holding said first and second portions in static relationship to each other;

a fastening member for engaging said U-shaped bolt whereby said U-shaped bolt is coupled to said central tow bar member;

a pair of locking pins, each locking pin being insertable through aligned holes in a respective one of said eye links for coupling said eye links to tow rings of a vehicle; and a pair of cotter pins, each cotter pin being insertable through an associated one of said locking pins for securing said locking pin to said respective eye link.

* * * * *